(12) United States Patent
Yu et al.

(10) Patent No.: US 7,082,817 B1
(45) Date of Patent: Aug. 1, 2006

(54) WIRELESS TIRE PRESSURE MONITORING DEVICE (WTPMD) SHELL STRUCTURE

(75) Inventors: Sin Yu, Hsinchu (TW); Guang-Li Chang, Hsinchu (TW); Ming-Kuan Liao, Hsinchu (TW)

(73) Assignee: Mobiletron Electronics Co., Ltd., Taichung (TW)

( * ) Notice: Subject to any disclaimer, the term of this patent is extended or adjusted under 35 U.S.C. 154(b) by 0 days.

(21) Appl. No.: 11/015,975

(22) Filed: Dec. 20, 2004

(51) Int. Cl.
*E01C 23/00* (2006.01)

(52) U.S. Cl. ...................................................... 73/146

(58) Field of Classification Search ............... 73/146.8, 73/146, 146.5; 340/447, 442
See application file for complete search history.

(56) References Cited

U.S. PATENT DOCUMENTS 6,672,150 B1 * 1/2004 Delaporte et al. ......... 73/146.2
6,805,000 B1 * 10/2004 Sheikh-Bahaie ........... 73/146.8

* cited by examiner

*Primary Examiner*—Jewel V. Thompson
(74) *Attorney, Agent, or Firm*—Egbert Law Offices

(57) ABSTRACT

A shell structure for Wireless Tire Pressure Transmission Devices. The internal part of this shell is a space provided for installation of a Wireless Tire Pressure Transmission Device and the bottom part of the shell is a fixture dimension which enables attachment of the Wireless Tire Pressure Transmission Device onto the surface of the tire-rim. On the two ends of the shell, wire-holes are designed to provide for wire-fixing. The fixture dimension on the bottom of the shell, viewed from the cross-section, is designed in a slanting dimension. Or, the wire-holes of the shell can be designed to form a slanting angle to replace the above-stated slanting dimension of the shell-fixing surface.

5 Claims, 5 Drawing Sheets

US 7,082,817 B1

WIRELESS TIRE PRESSURE MONITORING DEVICE (WTPMD) SHELL STRUCTURE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention involves a shell structure for Wireless Tire Pressure Transmission Devices; specifically, it is a new structural design with a slanting surface at the bottom or slanting angle formed by the fixing wires.

BACKGROUND OF THE INVENTION

A Wireless Tire Pressure Transmission Device is a product usually fixed on the tire-rim, used to detect the tire pressure and send out a signal. As learnt, the outer part of a Wireless Tire Pressure Transmission Device is often covered with a shell, and the bottom of the shell is often designed with a sunken curvier surface to fit the curves of a tire-rim. On the two ends of a shell, wire-holes are often designed for fixing of steel wires and the wires are usually coiled on the tire-rim to fix the shell on the wheels. Only, the learnt structure of Wireless Tire Pressure Transmission Device shells has a few problems in practical use. The problems are described in the following.

When viewing from the cross-section of a tire-rim, it can be seen that the bottom of the shell for a Wireless Tire Pressure Transmission Device is often flat. However, for most tire-rims available in the market now, their cross-sectional surface provided for installation of the Wireless Tire Pressure Transmission Devices shell are not in a horizontal angle. Thus, when the wires are tighten to hold the shell, the unit would be in a slanting position without exertion of stabilizing forces, or even the wires are tightened, the steal wires are not are not able to completely join with the wire-holes of the shell; therefore, practically, optimum effect of positioning can not be achieved. In result, the normal functioning of electronic components inside of a Wireless Tire Pressure Transmission Device is often affected due to excessive shaking and life of the device shortened Therefore, for the above known problems of shell structures for Wireless Tire Pressure Transmission Devices, designing a new and more practical structure are goals and directions of relevant businesses.

In view of which, the creators of this device, who have been involved in developing and designing relevant products for years, evaluated the above aims and designed a module that is highly suitable for practical uses.

BRIEF SUMMARY OF THE INVENTION

This invention improved the following:

1. This structure provides a bottom surface with slanting dimension or slanting wire-hole angled structural design for Wireless Tire Pressure Transmission Devices. It is the first in the industry; therefore, it meets the innovative criteria of a patent application.

2. With this new and improved design, the shell can be stably attached to the slanting surface of the tire-rim with the pressure exerted by the fixing-wires for better positioning effects, and further enables normal functioning of the Wireless Tire Pressure Transmission Devices and extends their usage lives.

This invention may bring the following new effects:

1. The fixing surface of the shell forms a sunken edge, which can be used to minimize the dimension of the fixing surface and form the flexibility of pressurized distortion to respond to the micro-divergence of the curves of different tire-rims.

2. The shells can be coupled and installed on the two corresponding sides of the tire-rim. Through which, when the fixing wires are tightened, a corresponding and balanced stabilizing effect can be achieved.

The above descriptions are better implementation examples of the technical features of this invention. Those who are familiar with the technology may alter or change this invention under the principle that the altered product may not deviate from the originality of this invention and such alterations and changes are encompassed in the defined scope of this patent application.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
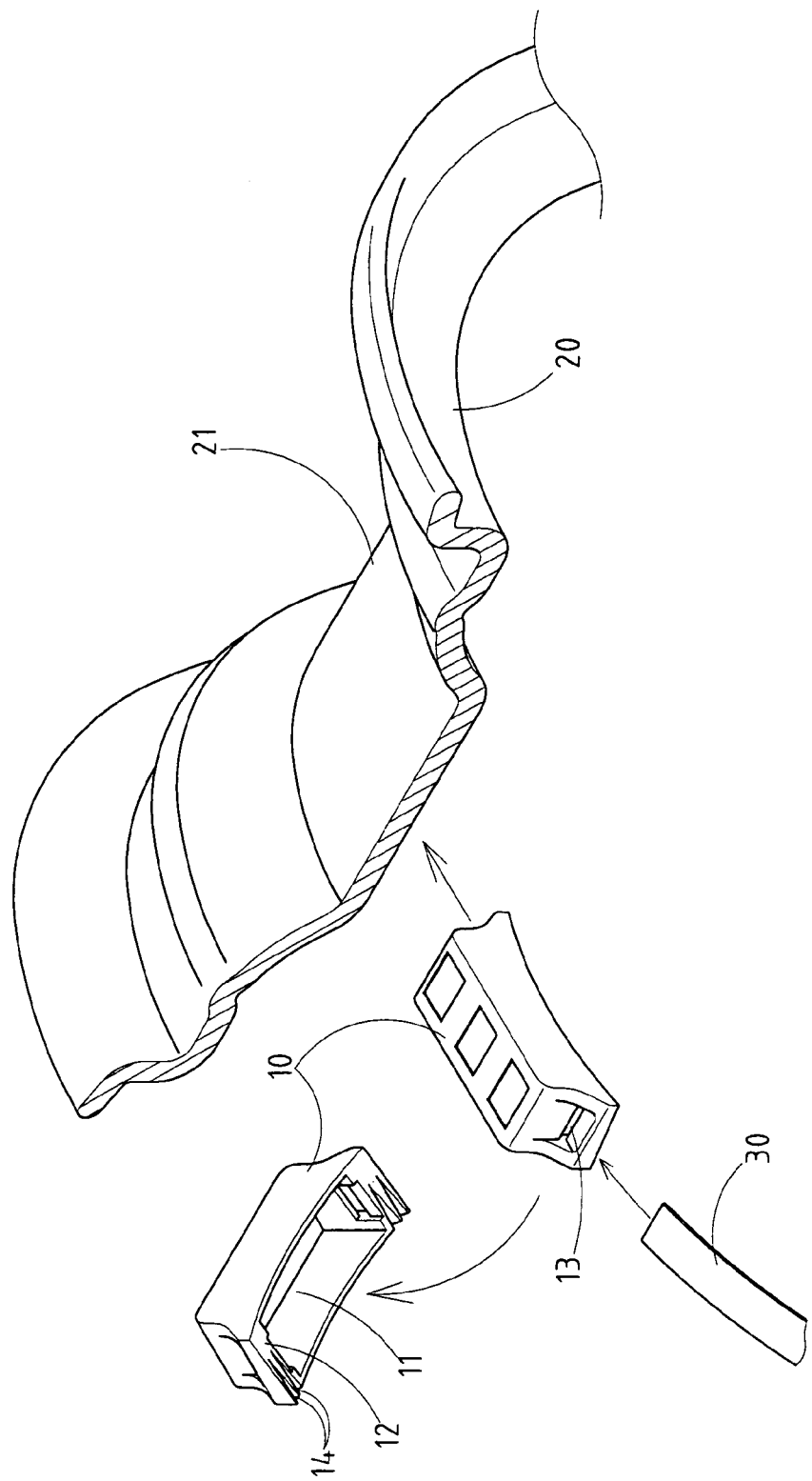
FIG. 1 shows a partial sectional view of this invention.
Figure 2:
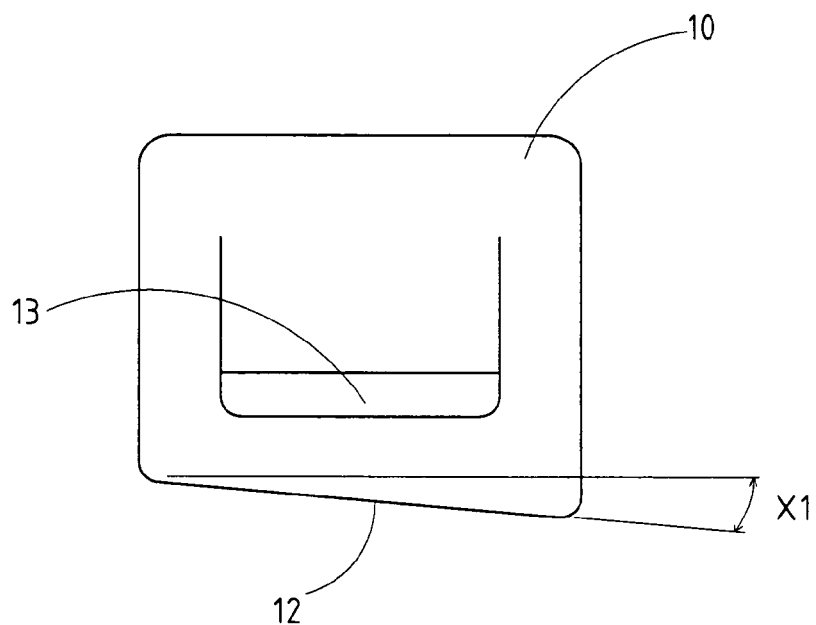
FIG. 2 shows the side elevation view of the Wireless Tire Pressure Transmission Device shell.
Figure 3:
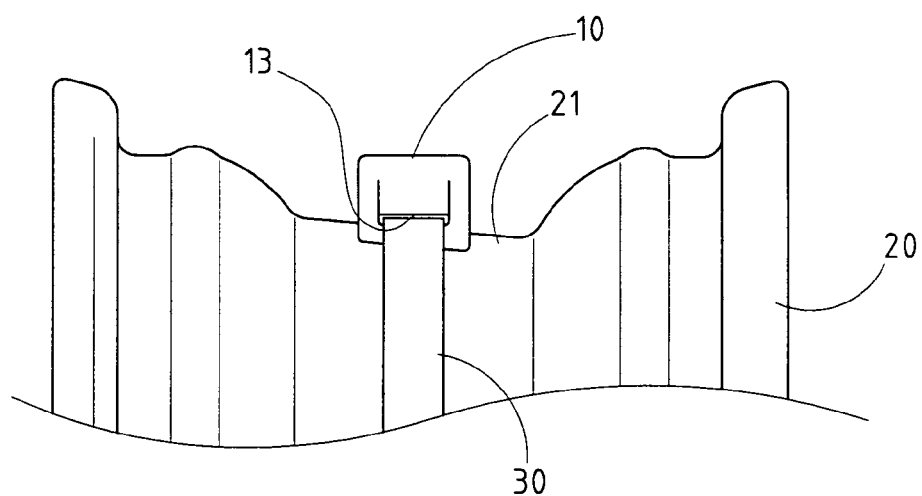
FIG. 3 shows the partial elevation view of the Wireless Tire Pressure Transmission Device shell installed on a tire-rim.
Figure 4:
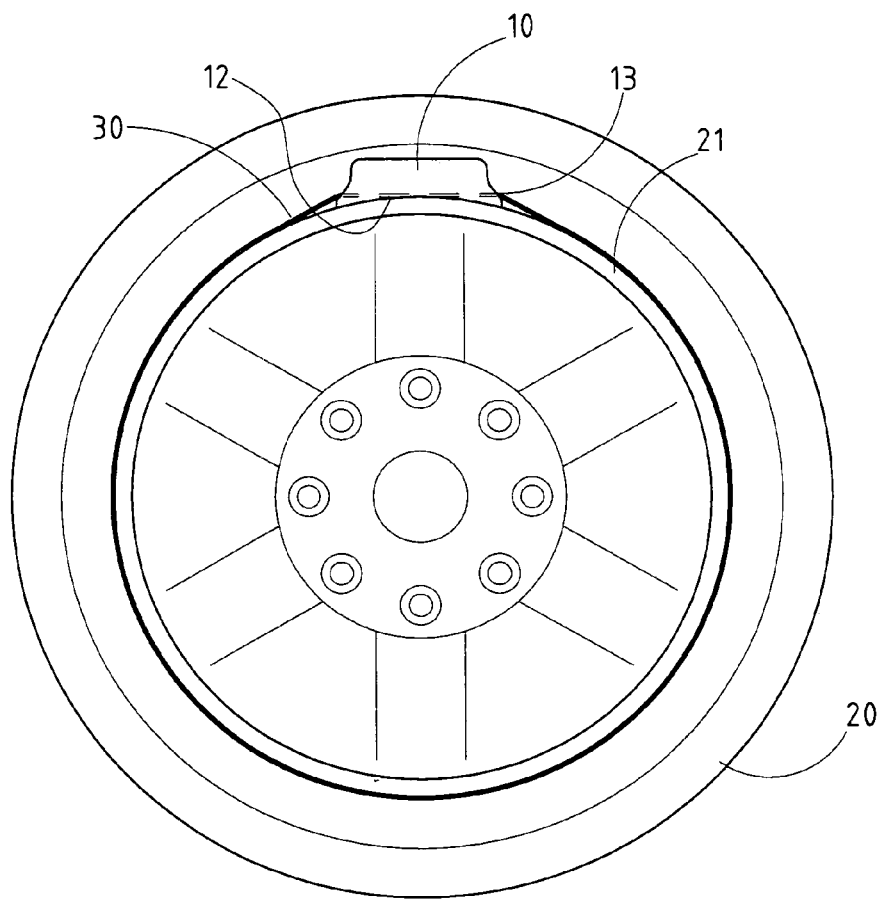
FIG. 4 shows a front elevation view of the Wireless Tire Pressure Transmission Device shell installed on a tire-rim.

As shown in FIGS. 1, 2, and 3, which is a better implementation example of the Wireless Tire Pressure Transmission Device Shell Purporting Structure. The internal part of this shell 10 is a space 11 provided for installation of a Wireless Tire Pressure Transmission Device (not shown in drawings), and the bottom part of the shell is a fixture dimension 12 which enables attachment of the Wireless Tire Pressure Transmission Device onto the surface 21 of the tire-rim 20. On the two ends of the shell 10, wire-holes 13 are designed to provide for wire-fixing 30 (i.e. steel wires). The features of this invention are as the following.

The fixture dimension 12 on the bottom of the shell 10, viewing from the cross-section of the tire-rim 20, is designed in a slanting dimension. That is, as shown in FIG. 2, an angle X1 is formed between the fixing surface 12 and the horizontal line, and the angle is designed to conform to the curve of the surface 21 of the existing tire-rim 20.

In which, the fixing surface 12 of the shell 10 forms a sunken edge 14, which can be used to minimized the dimension of the fixing surface 12 and form the flexibility of pressurized distortion.

Figure 5:
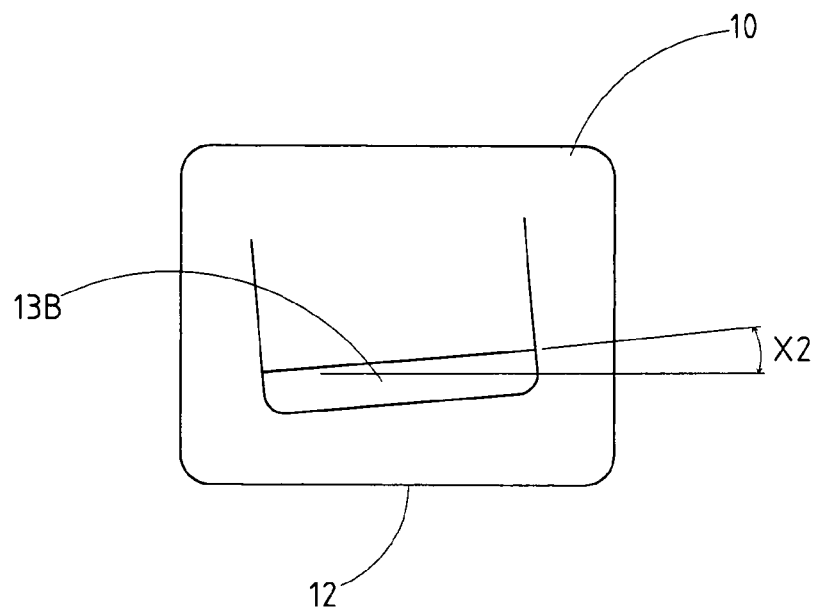
FIG. 5 shows a side elevation view of another Wireless Tire Pressure Transmission Device shell implementation.
Figure 6:
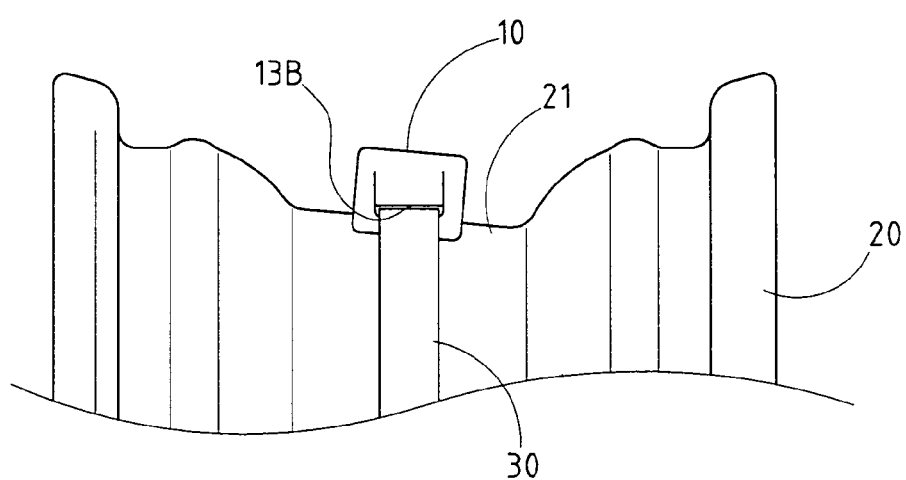
FIG. 6 shows a partial side elevation view of another Wireless Tire Pressure Transmission Device shell implementation installed on a tire-rim.

Again, as shown in FIG. 5, which is another better implementation example of the Wireless Tire Pressure Transmission Device Shell Purporting Structure, the differences between these two examples are as this following: Viewing from the cross-section of the tire-rim 20, the wire-holes 13B of the shell 10 are designed to form a slanting angle, but the fixing surface 12 of the shell 10 remains flat. That is, as shown in FIG. 5, an angle X2 is formed between the wire-holes 13B and the horizontal line, and the angled is designed to conform to the curve of the surface 21 of the existing tire-rim 20. With this design, when assembling (as shown in FIG. 6) and the fixing wires 30 are tightly fixed, since the demission formed by the wire-holes 13B on the shell 10 is slanting, the shell will be smoothly matched with the curvier surface 21 of the tire-rim 20 and remains in a horizontal position when the fixing wires 30 are pressed, to achieve positioning through the stabilizing pulling forces.

Figure 7:
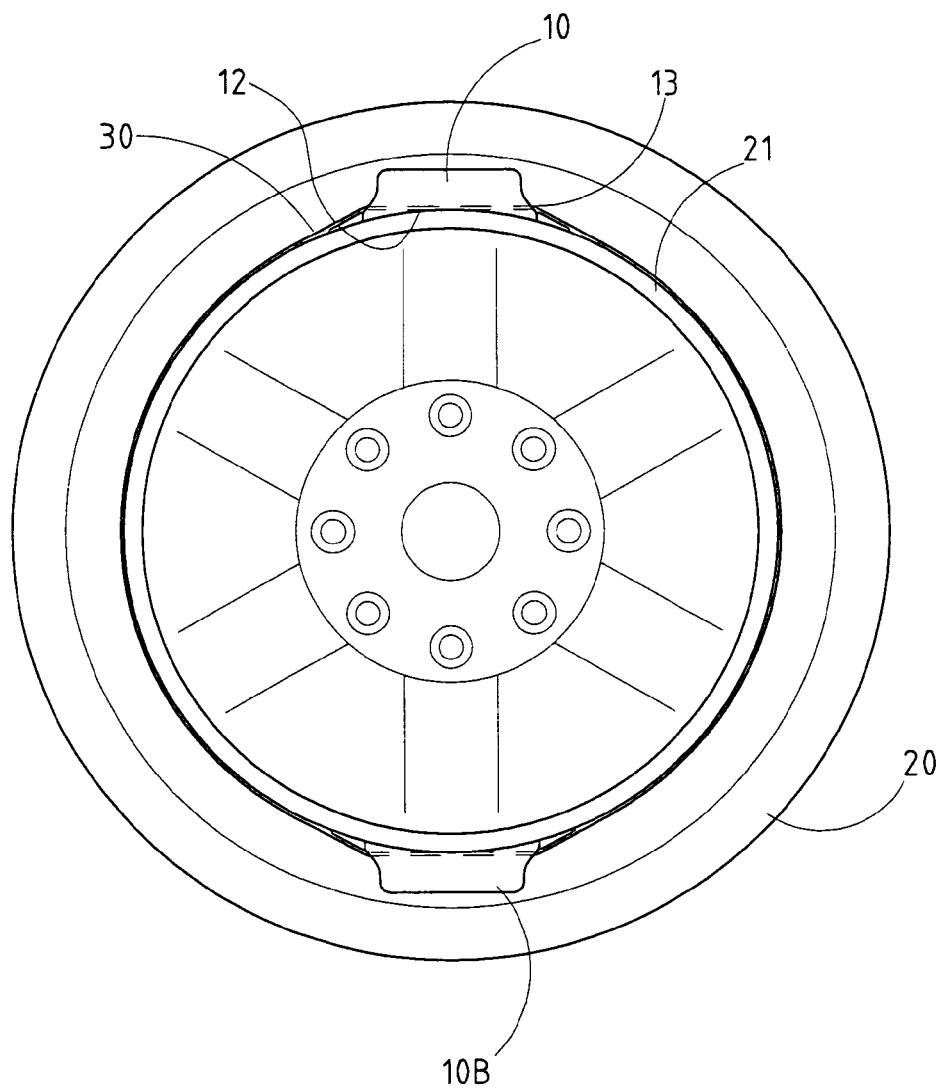
FIG. 7 shows the front elevation view of the Wireless Tire Pressure Transmission Device with coupled positioning.

Furthermore, an example suitable for the above two implementation structures is: the shells 10 and 10B can be coupled and installed on the two corresponding sides of the tire-rim 20 (as shown in FIG. 7). Through which, when the fixing wires are tightened, a corresponding and balanced stabilizing effect can be achieved.

We claim:

1. An apparatus for retaining a wireless tire pressure transmission device therein, the apparatus comprising:

a shell having a bottom portion suitable for conforming to an interior surface of a tire rim, said shell having a first end wall and a second end wall at opposite ends thereof, said shell having side walls extending between said first and second end walls, said shell having a space therein defined between said side walls and said first and second end walls suitable for receiving the wireless tire pressure transmission device therein, each of said first and second end walls having a slot formed therein, said bottom portion of each of said first and second end walls defining an acute angle with respect to the slot.

2. The apparatus of claim 1, said bottom portion having a sunken edge at said first and second end walls.

3. The apparatus of claim 1, said bottom portion defining an acute angle with respect to the slot at a cross-section of said shell extending parallel to said first and second end walls.

4. The apparatus of claim 1, the slot extending generally horizontally, said bottom portion at said first and second end walls being slanted with respect the slot.

5. The apparatus of claim 1, said bottom portion at said first and second end walls extending generally horizontally and the slot being slanted relatively thereto.

* * * * *